April 22, 1969     A. A. SPISAK     3,439,386
PLASTIC FALLER BAR
Filed April 4, 1966
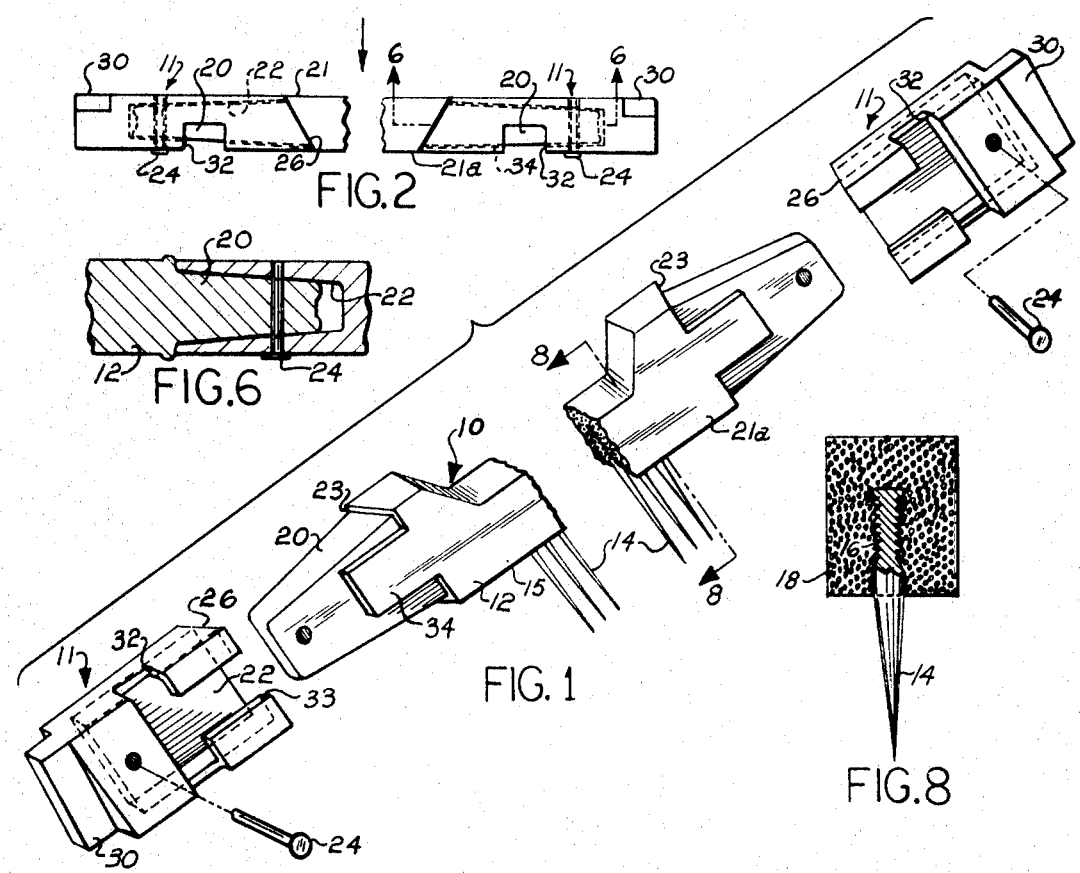
INVENTOR.
ANDREW A. SPISAK
BY *Hoffmann and Yount*
ATTORNEYS

United States Patent Office 3,439,386
Patented Apr. 22, 1969

3,439,386
PLASTIC FALLER BAR
Andrew A. Spisak, Cleveland, Ohio, assignor to The Warner & Swasey Company, Cleveland, Ohio, a corporation of Ohio
Filed Apr. 4, 1966, Ser. No. 539,865
Int. Cl. D01g *19/10*
U.S. Cl. 19—129                            10 Claims

ABSTRACT OF THE DISCLOSURE

The faller bar comprises a solid plastic gill bar connected at each end to metal drive members which are operatively connected to a screw device to move the faller bar in the gill box. The gill bar is constructed of high impact plastic material having elongated strands of reinforcing fibrous material such as fiber glass extending lengthwise therethrough to strengthen the bar while permitting deflection thereof during operation. The gills are likewise embedded in the plastic faller bar by various connecting arrangements. The ends of the faller bar are so constructed and arranged to mate with the drive members to provide a wedging engagement therebetween to resist bending forces applied thereto during the combing action. The driving members are locked to the ends of the gill bar by pin members which can be readily removed to permit the gill bar to be replaced.

---

The present invention relates to faller bars for use in intersecting frame gill boxes for combing and drafting textile fibers. Intersecting frame gill boxes for treating textile fibers commonly comprise faller bars which are moved by a screw drive, the bars having gills or pins which engage the textile fiber as the fiber is moved through the gill box. The faller bars are moved through a path where the gills engage and comb the fiber by a forward screw conveyor and are returned by a return screw conveyor. Faller bars for use in such machines commonly comprise a gill bar, including a beam in which the gills are mounted, and drive members at the opposite ends of the gill bar for the engaging screw conveyors of the gill box.

High impact and high bending forces are applied to the faller bars during operation of the machine and these forces tend to dislodge the gills from the beam causing the faller bar to fail. During operation, the faller bars are commonly knocked from one screw conveyor to the other by cams which engage the drive members. These cams apply high impact forces to the drive members.

As a commercial practice, faller bars have been constructed with a metal beam or with a beam heavily reinforced with metal to provide a bar sufficiently rigid to withstand the forces to which the bars are subjected during their operation. In the past, the construction of the bars has been such that the bars can be re-pinned when their gills fail so that the overall cost of the bars may be reduced by prolonging the life of the relatively high cost of the metal parts.

It is an object of the present invention to provide a new and improved faller bar which is lighter weight; to reduce the effect of the impact forces acting on the bar during its use; and which has a useful life and initial cost such that the gill bar can be completely replaced rather than re-pinned when the gills fail.

Another object of the present invention is to provide a new and improved fallen bar which has a plastic beam for supporting the gills which does not require metal reinforcement for substantially the length of the beam to make the beam sufficiently rigid to withstand the forces encountered during the use of the bar and which preferably has metal drive members each of which cooperate with the beam to resist bending of the beam resulting from the forces setup during the combing of a fiber and which are removable and reuseable with a new beam.

It is still another object of the present invention to provide a new and improved faller bar having a beam which is substantially made entirely of plastic material for supporting the gills of the faller bar and which is reinforced by a flexible fibrous material whereby the beam returns to its original shape when the bending forces are removed.

A still further object of the present invention is to provide a new and improved gill beam in which the gills interlock with the beam.

A still further object of the invention is the provision of a new and improved faller bar of the above-described construction in which the connections between the comb bar and the drive ends or caps on the ends of the comb bar are fitted together in a separable manner such that they are not loosened by the flexing and twisting of the comb bar or the impact forces produced by the transfer cams.

The invention resides in certain constructions and combinations and arrangements of parts, and further objects and advantages of the invention will become apparent to those skilled in the art to which it relates from the following description of the preferred embodiment described with reference to the accompanying drawings forming a part of this specification, and in which:

FIG. 1 is an exploded isometric view of the separate parts which form the faller bar of the present invention;

FIG. 2 is a plan view of the assembled faller bar of the present invention with a portion broken;

FIG. 3 is an elevational view of the center or gill bearing portion of the faller bar shown in FIG. 1;

FIG. 4 is a side view of one embodiment of a gill that can be used in the faller bar of FIG. 1;

FIG. 5 is a side view of another embodiment of a gill which can be used in the faller bar of FIG. 1;

FIG. 6 is an enlarged fragmentary cross-sectional view taken approximately along line 6—6 of FIG. 2 showing the manner in which the drive members are wedged upon the ends of the gill bar;

FIG. 7 is a showing of a modified gill; and

FIG. 8 is a sectional view taken on the line 8—8 of FIG. 1 and showing the interlocking of the gills and the reinforcing fibers in the gill bar.

A faller bar embodying the present invention is illustrated in the drawings. As shown therein, the faller bar comprises a gill bar 10 and drive members 11 at each end of the gill bar 10. The gill bar 10 comprises a beam 12 of plastic material, preferably a high impact plastic and a row of gills 14 having end portions embedded in the plastic beam and extending from the bottom side 15 of the beam 12.

Heretofore, problems have been encountered in using plastic as the material for the beam of the gill bar because plastic material tends to bend and the large uneven forces which are applied to the gills 14 during the combing action tend to cause a wobbling action which when combined with the bending forces often has caused the gills to pull out from the gill bar. Consequently, commercial gill bars have heretofore been made of metal or included substantial metal reinforcement extending substantially the length of the beam.

In accordance with one feature of the invention, I have found that if a beam of high impact plastic is reinforced substantially throughout its length with a fibrous material, such as strands of fiber glass, it is not necessary to use heavy metal reinforcing which extends substantially the length of the beam in order to obtain a commercial faller bar and the bar will assume its original shape when the bending forces are removed. Moreover, the gills 14 are preferably provided with interlocking surfaces 16. These interlocking surfaces 16 effect a locking between the gills and beam and aid in keeping the gills 14 from pulling out of the plastic in which the gills are embedded. The gill shown in FIG. 5 has a modified form of locking surface. As shown in FIG. 5 the upper end of the gill may have a flat head for forming a surface 16' for holding the gill against pull-out. Preferably, the fibrous material is entwined underneath the gripping surfaces to provide a more secure grip between the plastic beam and the gill. The fibrous material in the beam is designated by the reference numeral 18. The gill may be interlocked by being tapered as shown in FIG. 7. In FIG. 7 the taper is a compound taper with the angle of divergence of the taper being greater at the portion to be embedded than at the projecting portion 17.

The beam 12 has a central portion 19 and terminal portions 20 of reduced cross-sectional dimension projecting outwardly from each end of the central portion with the terminal portions 20 being received in sockets 22 in the drive members 11. The terminal portions 20 taper to their smallest cross-sectional area at the outer ends of the terminal portions 20. In the illustrated embodiment, the terminal portions 20 are generally rectangular in cross-section. The terminal portions 20 project from walls 23 at the inner ends of the terminal portion 20 which lie in respective planes perpendicular to the bottom 15 of the beam 12 and which converge in the direction which the bar tends to be bent by the forces applied thereto during the combing action. In the illustrated embodiment, the forces applied to the bar during use act from the back 21 to the front 21a of the bar and the walls 23 therefore converge in this direction.

Each drive member 11 abuts the adjacent wall 23 and is wedgingly received with a drive fit in the sockets 22. The drive members are preferably also connected to the gill bar by rivet pins 24 which extend through respective drive members 11 and the projections received thereby. The pins 24 may be driven out to remove the drive members. The drive members are also preferably bonded to the terminal portions 20 with a bond that allows the drive member to be removed.

The sockets of the drive members which receive the terminal portions 20 have a configuration adapted to generally mate with the terminal portions 22 of the gill bar. In the preferred embodiment, the internal side surfaces of the sockets 22 are slightly more tapered than the side surfaces of the terminal portions of the gill bar to insure that a wedging fit is produced at the extreme ends of the terminal projections 20 when the drive members are driven over the terminal portions 20 and into engagement with the shoulder around the terminal portions provided by the wall 23. It will be noted that the plane of the inner end face 26 of each of the drive members 11 is included with respect to the front of the drive member to provide pads at the inner end of the drive members which abut the adjacent wall 23 providing cooperating pads on all sides of the drive member. Thus, bending forces applied to the gill bar and acting from the back to the front of the bar will tend to wedge the central portion 19 between the end faces 26 of the drive members to set up compressing forces acting lengthwise between the end faces to aid in resisting bending of the beam. The angularity of the end faces 26 also facilitates the transmitting of the bending forces to the drive members and minimizes the tendency to concentrate stresses in the beam at the inner ends of the members 11.

The drive members 11 include conventional diagonal tongues 30 at each of the outer ends of the faller bars which are adapted to engage the helical surfaces of lead screws, not shown, by means of which the faller bars are moved through the gill box. The drive members also each include a vertical groove 32 in its front surface which faces in the direction of movement of the faller bar for receiving guides, not shown, that are used to guide and control the movement of the faller bar between forward and return lead screws.

Preferably the drive members 11 are also provided with a longitudinal slot 33 in the front face of the faller bar which intersects the groove 32 and opens into the end face 26. The gill beam has raised portions 34 on the terminal portions 20 which extend outwardly from the shoulder 23 and flush with the front face of the bar to be received in the slots 33. The raised portions 34 provide reinforcement adjacent the juncture of the terminal portions and the central portions of the beam to enable the beam to take larger bending forces.

The structure of the faller bar described has proved such that the plastic beam and embedded gills will have a sufficiently long life, that the beam can be replaced when the gills pull out or the faller bar otherwise fails. The drive members 11 are made of metal and may be reused with a new gill bar.

It can now be seen that the present invention provides a new and improved faller bar which is low in cost and economical, and which is such that the beam thereof can be of plastic material without substantial metal reinforcement.

It is hereby my intention to cover all modifications, constructions and arrangements which fall within the ability of those skilled in the art and the scope and spirit of the present invention.

What is claimed is:

1. A faller bar for textile machines and the like comprising a beam of high impact plastic material having terminal portions and strands of fibrous reinforcing material embedded in the beam for substantially the length thereof to reinforce the latter and a row of gills embedded in said beam and extending outwardly from one side thereof, and drive members on said terminal portions, and said terminal portions are tapered portions and said drive members are metal and have sockets therein which wedgingly receive said tapered terminal portions.

2. A faller bar as defined in claim 1 wherein said drive members are removable from said beam.

3. A faller bar as defined in claim 1 wherein said beam has an external shoulder at the inner end of each of said terminal portions engaged by the drive member which receives the portion, said external shoulder lying in a plane generally perpendicular to said side of said beam with the planes of said shoulders converging in the direction in which the combing forces are applied to the beam during use.

4. A faller bar as defined in claim 1 wherein said gills and beam having interlocking portions resisting pull-out of the gills.

5. A faller bar for textile machines and the like comprising a grill bar having first and second opposite sides and opposite sides joining said first and second sides with a longitudinal row of gills projecting from said second side, metal drive members for each end of said gill bar, said gill bar having projecting terminal portions received in said drive members and said drive members being mounted on said terminal portions, means on said drive members for cooperating with lead screws to drive said faller bars, and said drive members having a wall portion overlapping a mating portion of the adjacent terminal portion and of the gill bar, said wall portions of said drive members constituting part of one of said sides joining the first and second sides of said gill bar.

6. A faller bar as defined in claim 5 wherein said terminal portions are reduced in cross-section and said gill bar has an external shoulder at the inner end of each of said drive members which is engaged by the drive member, said shoulders and the inner ends of said drive members lying in planes perpendicular to said first side and converging in the direction which the gill bar tends to bend when in use.

7. A faller bar as defined in claim 6 wherein said shoulder extends on all sides of said faller bar.

8. A faller bar as defined in claim 5 in which the terminal portions are tapered portions and received in sockets in said drive members, said sockets and terminal portions being tapered to provide a wedging engagement of the terminal portions of the gill bar and the drive members.

9. A faller bar as defined in claim 8 wherein said terminal portions are reduced in cross-section and said gill bar has an external shoulder at the inner end of each of said drive members which is engaged by the drive member, said shoulders and the inner ends of said drive member lying in planes perpendicular to said first side and converging in the direction in which the gill bar tends to bend when in use.

10. A faller bar as defined in claim 3 wherein said shoulder extends on all sides of said faller bar, and said gill bar has raised portions on the front side thereof extending outwardly from the inner ends of the terminal portions and received in respective longitudinally extending slots in the drive member.

References Cited

UNITED STATES PATENTS 3,344,482  10/1967  Mann et al. _____ 19—129

OTHER REFERENCES

Levy, Robert M.; Glass Reinforced Plastic Pipe; Mechanical Engineering; pp. 45–47; April, 1961.

DORSEY NEWTON, *Primary Examiner.*